United States Patent
Bartl et al.

(10) Patent No.: US 9,664,234 B2
(45) Date of Patent: May 30, 2017

(54) BEARING POWER GENERATING CONFIGURATION

(71) Applicant: AKTIEBOLAGET SKF, Göteborg (SE)

(72) Inventors: Frank Bartl, Grenzach-Wyhlen (DE); Joseph Erskine, Falkirk (GB); Sebastian Ziegler, Schweinfurt (DE); Andreas Clemens Van Der Ham, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 105 days.

(21) Appl. No.: 14/395,155

(22) PCT Filed: Apr. 9, 2013

(86) PCT No.: PCT/EP2013/057380
§ 371 (c)(1),
(2) Date: Oct. 17, 2014

(87) PCT Pub. No.: WO2013/160098
PCT Pub. Date: Oct. 31, 2013

(65) Prior Publication Data
US 2015/0176655 A1    Jun. 25, 2015

(30) Foreign Application Priority Data
Apr. 24, 2012    (WO) .................. PCT/EP2012/057437

(51) Int. Cl.
*F02B 63/04*    (2006.01)
*H02K 7/18*    (2006.01)
(Continued)

(52) U.S. Cl.
CPC ............ *F16C 41/004* (2013.01); *F16C 33/78* (2013.01); *H02K 7/08* (2013.01); *H02K 7/088* (2013.01);
(Continued)

(58) Field of Classification Search
CPC ......... F16C 33/78; F16C 41/004; H02K 7/08; H02K 7/088; H02K 7/1807; H02K 7/1869
(Continued)

(56) References Cited

U.S. PATENT DOCUMENTS 4,948,277 A * 8/1990 Alff .................... F16C 33/7886
324/174
5,898,388 A * 4/1999 Hofmann ............ F16C 33/7879
310/168
(Continued)

*Primary Examiner* — Tulsidas C Patel
*Assistant Examiner* — Thomas Quigley
(74) *Attorney, Agent, or Firm* — Bryan Peckjian; SKF USA Inc. Patent Dept.

(57) ABSTRACT

A power generating bearing assembly comprising a power generating subassembly integrated into a bearing. The power generating subassembly utilizes the relative motion between a bearing inner ring and a bearing outer ring of the bearing to generate electrical power. A sealing system is attached to one of the bearings. The power generating subassembly includes an electrical generator in operational engagement with a magnetically polarized material. The electrical generator is attached to the non-sealing carrying bearing. The magnetically polarized material is integrated into a supported member, which is a unitary section of the seal that extends axially from an end surface of the bearing rings. The relative motion between the rings engages the electrical generator and the magnetically polarized material causing a generator core of the electrical generator to create an electrical current.

19 Claims, 3 Drawing Sheets

(51) Int. Cl.
  *F16C 41/00* (2006.01)
  *H02K 7/08* (2006.01)
  *F16C 33/78* (2006.01)

(52) U.S. Cl.
  CPC ......... *H02K 7/1807* (2013.01); *H02K 7/1869* (2013.01); *F16C 2300/02* (2013.01); *Y02E 10/725* (2013.01)

(58) Field of Classification Search
  USPC .................................. 290/1 A; 310/90, 90.5
  See application file for complete search history.

(56) References Cited

U.S. PATENT DOCUMENTS

| | | | | |
|---|---|---|---|---|
| 6,053,637 | A * | 4/2000 | Cacciatore | B61D 43/00 384/448 |
| 6,239,813 | B1 * | 5/2001 | Erskine | G06F 3/0481 345/440 |
| 6,398,395 | B1 * | 6/2002 | Hyun | A63C 17/26 362/192 |
| 8,878,408 | B2 * | 11/2014 | Rink | F16C 41/004 310/90 |
| 8,890,383 | B2 * | 11/2014 | Rink | F16C 41/004 310/90 |
| 2003/0173844 | A1 * | 9/2003 | Iwamoto | F16C 9/02 310/90 |
| 2004/0105602 | A1 * | 6/2004 | Mizutani | F16C 33/78 384/448 |
| 2015/0267755 | A1 * | 9/2015 | Bartl | F16C 41/004 310/90 |

* cited by examiner

BEARING POWER GENERATING CONFIGURATION

CROSS REFERENCE TO RELATED APPLICATIONS

This is a National Stage application claiming the benefit of International Application Number PCT/EP2013057380 filed on 9 Apr. 2013 (Apr. 9, 2013), which claims the benefit of International Application Number PCT/EP2012057437 filed on 24 Apr. 2012 (Apr. 24, 2012), both of which are incorporated herein by reference in their entireties.

TECHNICAL FIELD OF THE INVENTION

The present invention relates to an apparatus and method for generating power during motion of a bearing.

BACKGROUND

A bearing can be defined as any of various machine elements that constrain the relative motion between two or more parts to only the desired type of motion. This is typically to allow and promote free rotation about a longitudinal axis and/or restrain any linear movement of a component in a normal direction respective to the bearing. Bearings may be classified broadly according to the motions they allow and according to their principle of operation, as well as by the directions of applied loads they can handle.

Bearings undergo significant use, which causes wear to the various bearing components. Over time, the wear on the bearing can result in mechanical failure. Mechanical failure can impact the rotational motion and/or the axial linear restraint. Failure to control either of these movements can cause catastrophic failure to the machinery relying upon the bearing.

Bearing reliability and predictive servicing can impact the operation and uptime of equipment. Bearings are used in many applications, including vehicles, wind turbines, automated machinery, and the like. Over time, the bearings wear. Bearing failure during operation can cause significant damage to the equipment and possibly the surrounding area. The bearing failure could even potentially cause injury or death to people should the right circumstances come occur.

Bearing monitoring systems require power for operation. Power is utilized for operating the condition monitoring sensors, providing power for any computing devices, and providing power for transferring any collected information to a centralized system. The power is provided through wiring to the devises.

Bearing reliability and predictive servicing can be improved by monitoring the bearing. A monitoring system would require power. What is desired is a power generating system associated with the bearing assembly.

SUMMARY OF THE INVENTION

The present invention is directed towards an apparatus and respective method for generating electrical energy during the operation of equipment comprising a bearing.

In a first aspect of the present invention, a power generating bearing assembly, the power generating bearing assembly comprising:

a bearing comprising:
- a bearing outer ring having an outer surface, a bearing engaging inner surface, and an outer ring end surface,
- a bearing inner ring having a bearing assembly interior mating surface, a bearing outer race engaging surface, and an inner ring end surface, wherein the bearing engaging outer surface is sized to rotationally engage with said outer ring bearing engaging inner surface,
- a sealing system provided between the bearing outer ring and the bearing inner ring, wherein the sealing system is secured to a sealing attachment ring, wherein the sealing attachment ring is one of the bearing outer ring and the bearing inner ring and the remaining ring is a respective rotational ring, the sealing system comprising a magnetically polarized material supporting member carrying a magnetically polarized material, the magnetically polarized material supporting member provided as a unitary section of the sealing system extending axially beyond the ring end surfaces,
- wherein said inner ring is rotatationally assembled within said outer ring bearing engaging inner surface; and an electrical power generator including a generator core comprising an electrical coil wound about a magnetic core to generate electrical power, the electrical power generator being attached to the respective rotational ring directing the generator core in a radial direction to operationally engage with the magnetically polarized material;

wherein the relative motion between the bearing outer ring and the bearing inner ring passes the magnetically polarized material across the generator core causing the generator core to create an electrical current.

In a second aspect, the system further includes a processing device comprising a set of digital instructions for monitoring and analyzing digital data provided by a condition monitoring system integrated into the bearing assembly.

In another aspect, the electrical power generator further comprises a circumferential gliding material disposed on a surface opposing the magnetically polarized material.

In another aspect, the sealing system provides for tolerance compensation along a radial direction.

In another aspect, the magnetically polarized material is provided having a height greater than a predetermined anticipated axial motion of the generator core.

In another aspect, the magnetically polarized material can be provided in a complete annular ring; in a single section covering a partial circularly shaped section; or in a series of sections which are spatially at equal radial distances from a bearing ring center.

One advantage of the present invention is the ability to generate a continued electrical current during motion of one of the rings of the bearing. The power can be utilized to operate bearing condition monitored equipment. The inclusion of an electrical power-generating device eliminates any need for a locally stored power (such as by a battery) or conveyed power from an external power source. By generating power at the location, the system can operate completely independent and un-tethered from any other device by providing sufficient power for wireless signal communications. While yet another advantage is that operation of the monitoring system can be limited to the time where the bearing is undergoing rotation. Power is only applied to the system when the generator is subjected to the relative motion between the bearing outer ring and the bearing inner ring.

Bearings can be utilized on equipment deployed in remote locations. The location could complicate any provisions for externally provided power for monitoring the condition of the bearing. The bearing(s) can be integrated into the equipment at a location that is difficult to access, particularly for wiring. Further, wires can accidentally interfere or become abraded by any rotational movements or other movements of components of the equipment.

Another advantage enables the registration between the electrical power generator and the magnetically polarized material to adapt to changes and wear of the bearing. The mechanical interface includes features to accommodate for radial and axial changes between the electrical power generator and the magnetically polarized material.

The use of a magnetic density operated generator core eliminates any wear and reliability issues associated with moving components. Any contacting surfaces can include bearings, friction reduced surfaces, and the like to minimize any impact resulting from relative motion between two moving components contacting one another.

In a configuration where the sealing system is attached to the bearing inner ring, the centrifugal force ensures the magnetically polarized material remains proximate the generator core. A sealing feature rides against the bearing race engaging surface to adapt the radial position of the magnetically polarized material supporting member, thus retaining the axial relation between the magnetically polarized material supporting member and the electrical power generator. The axial relation between the magnetically polarized material supporting member and the electrical power generator can be a frictional interface or an air gap.

In a configuration where the sealing system is attached to the bearing outer ring, the annular ring shape retains the magnetically polarized material proximate to the generator core.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF THE PRESENT INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
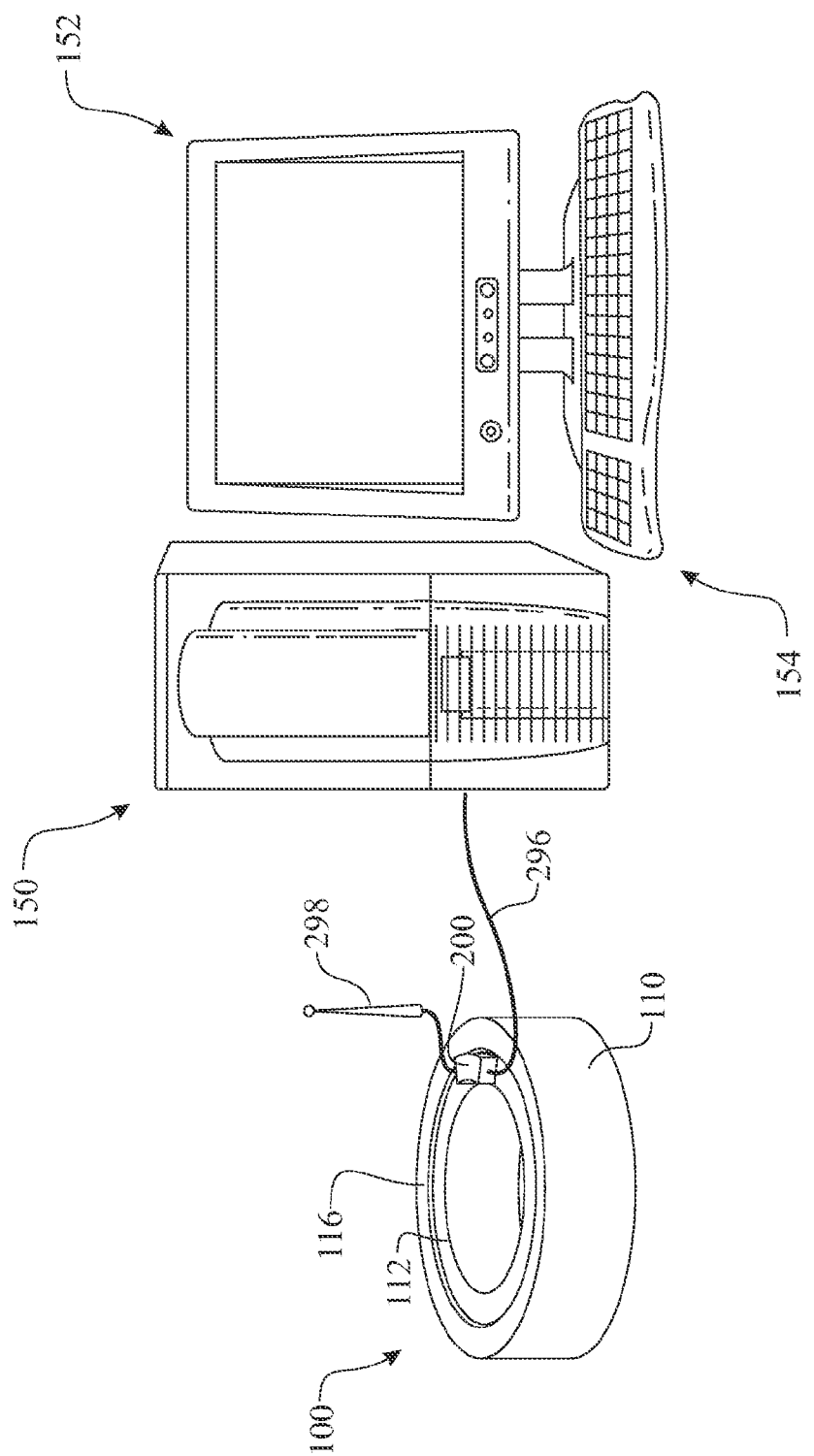
FIG. 1 presents an exemplary schematic diagram of a bearing power generator and bearing condition monitoring system.

A generic exemplary system schematic is presented in FIG. 1. The generic system includes a power generating bearing assembly 100 comprising a power generating subassembly 200 integrated into bearing 110. The bearing 110 is fabricated having a bearing inner ring 112 assembled within a bearing outer ring 116, wherein the interface between the bearing inner ring 112 and the bearing outer ring 116 restrains the relative motion to a rotational motion about a central axis. The relative rotational motion provided between the bearing inner ring 112 and the bearing outer ring 116 causes the power generating subassembly 200 to generate electrical energy in a form of an electrical current. The power generating subassembly 200 can include a sensor, a digital signal processor or any other device to embed a digital data signal within a current. The digital data signal is transmitted to a processing unit 150 via a wired signal interface 296 or preferably via a wireless signal interface 298. The wireless signal interface 298 includes circuitry and components respective to any selected wireless transmitting protocol. Power would be provided by the power generating subassembly 200 to operate the wireless signal interface 298.

The processing device 150 includes common digital data processing components, include a motherboard, at least one microprocessor, memory, a data recording device, digital instructions (such as software, firmware, and the like), input/output controllers, data communication devices, and the like. A user input device 154 and a user output device 152 are connected in signal communication to the processing device 150 through the input/output controllers. The digital data signal is received by the processing unit 150 and interpreted accordingly. The digital data signal would be provided when the power generating bearing assembly 100 is subjected to movement. The relative movement between the bearing inner ring 112 and the bearing outer ring 116 causes the power generating subassembly 200 to generate electrical power. Therefore, the electrical power is only available when the bearing inner ring 112 and bearing outer ring 116 are in relative motion to one another. It is understood that electrical power can be stored in a capacitor or battery integrated within the power generating subassembly 200. This would enable short cycles of additional power for continued operation after the bearing inner ring 112 and bearing outer ring 116 become stationary respective to one another. This would be beneficial for recording conditions of the bearing 110 after halting any operation, during cool down, and the like. The system can be recording conditions such as temperature, and the like.

Figure 2:
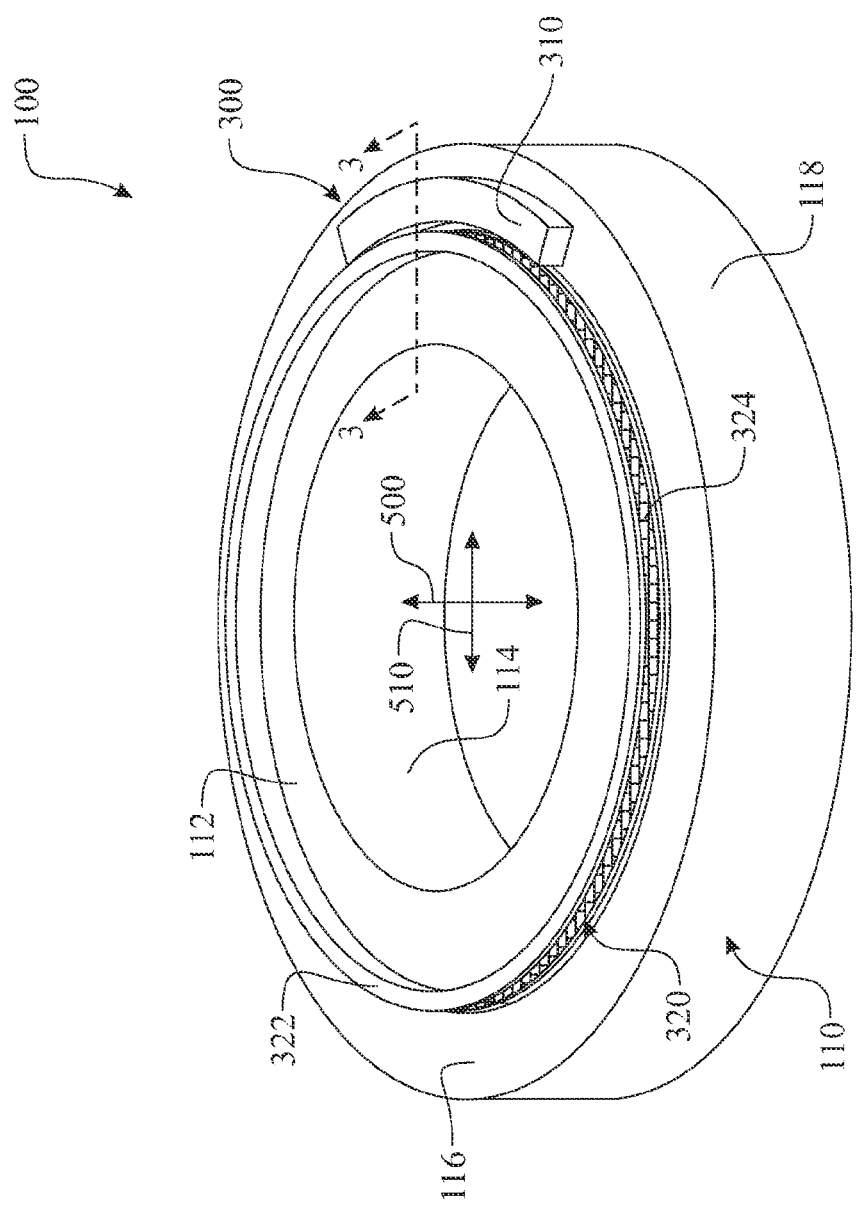
FIG. 2 presents an isometric top view of an exemplary power generating bearing assembly.
Figure 3:
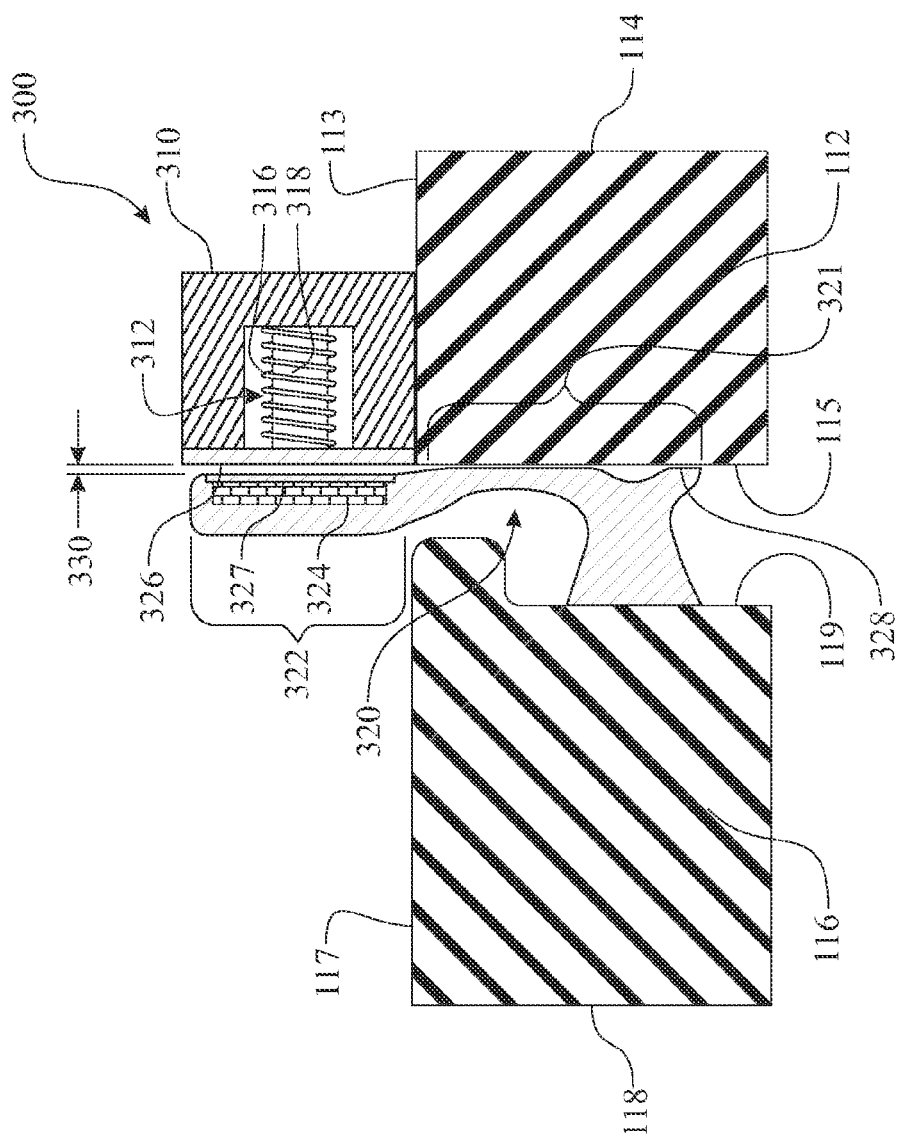
FIG. 3 presents a sectioned view of the exemplary power generating bearing assembly originally introduced in FIG. 2, the section taken along section line 3-3 of FIG. 2.

An exemplary embodiment of the power generating subassembly 200 is presented as a power generating subassembly 300 illustrated in FIGS. 2 and 3. Orientation references are represented by the directional lines illustrated in FIG. 2. An axial direction 500 is parallel to the axis or rotation of the bearing rings 112, 116. A radial direction 510 is parallel to a radius of the bearing rings 112, 116. The illustrations present additional details of the bearing 110. Features of the bearing inner ring 112 can be referred to as: a bearing assembly component engagement surface 114 defining an inner peripheral surface thereof; a bearing outer race engaging surface 115 defining an outer peripheral surface thereof; and an inner ring end surface 113 defining an end surface thereof. Features of the bearing outer ring 116 can be referred to as: a bearing outer surface 118 defining an outer peripheral surface thereof; a bearing outer race engaging surface 119 defining an inner peripheral surface thereof; and an outer ring end surface 117 defining an end surface thereof. At least one bearing race set (not shown) can be assembled between the bearing inner ring 112 and bearing outer ring 116. The bearing race set can be selected from any configuration known by those skilled in the art. A sealing system 130 can be attached to one of the bearing rings 112, 116. The bearing that retains the sealing system 130 can be referred to as a sealing attachment bearing ring. The remaining ring is a respective rotational bearing ring.

In the exemplary embodiment, the bearing 110 comprises a sealing system 320. The sealing system 320 spans between the bearing inner ring 112 and bearing outer ring 116 forming a seal therebetween. The sealing system 320 would be affixed to a sealing attachment ring, wherein the sealing attachment ring is one of the bearing outer ring 116 and the bearing inner ring 112, wherein the remaining ring is subsequently referred to as a respective rotational ring. The sealing system 320 is fabricated of any suitable sealing material, including rubber, nylon, and the like. A sealing feature 328 remains in contact with the bearing outer race engaging surface 115, providing a seal therebetween. The sealing feature 328 can be shaped in any suitable geometry to optimize the sealing interface. The sealing feature 328 additionally retains the magnetically polarized material supporting member 322 at a desired spatial arrangement with the electrical power generator 310, thus retaining an air gap 330. The sealing system 320 is provided in a circular shape (as best illustrated in FIG. 2), being continuous about the circumference of the interface between the bearing outer race engaging surface 115 and bearing outer race engaging surface 119. A magnetically polarized material supporting member 322 extends in an axial direction from a sealing section 321 extending beyond the ring end surfaces 113, 117. The sealing section 321 and the magnetically polarized material supporting member 322 are preferably fabricated as a unitary portion of the sealing system 320. The magnetically polarized material supporting member 322 would also be formed in a continuous annular ring shape. A magnetically polarized material 324 is integrated into the magnetically polarized material supporting member 322 in a manner to engage with a generator core 312 of an electrical power generator 310. The magnetically polarized material 324 can be any material or configuration of materials providing a variable reluctance. The magnetically polarized material 324 can be provided in a complete annular ring, a series of segments spatially arranged about the annular ring, or a single independent section along the annular ring. A magnetically polarized material coating 327, fabricated of any suitable friction reducing material (described in detail below) may be applied to the exposed surface of the magnetically polarized material 324.

An electrical power generator 310 is included as a component of the power generating subassembly 300, wherein the electrical power generator 310 includes a generator core 312. The generator core 312 comprises an electrical coil 316 wound about a magnetic core 318. The electrical power generator 310 is assembled to the respective rotational ring orienting the generator core 312 in a radial direction to operationally engage with the magnetically polarized material.

An optional circumferential gliding material 326 can be attached to the electrical power generator 310, the circumferential gliding material 326 being attached upon a surface which is parallel and proximate the magnetically polarized material 324.

In operation, as the bearing inner ring 112 and bearing outer ring 116 rotate respective to one another, the generator core 312 passes across the magnetically polarized material 324. The magnetically polarized material 324 includes variations in magnetic properties, wherein as the magnetically polarized material 324 moves relative to the generator core 312, the variations in magnetic properties changes the magnetic flux of a magnetic core 318 integrated into the generator core 312. The change in magnetic flux creates an electrical current in an electrical coil 316 wrapped about the magnetic core 318. The electrical current is conveyed to other equipment by wires or other electrical conduits.

The circumferential gliding material 326 can be any friction reducing material, including Polytetrafluoroethylene (PTFE), and the like. PTFE is a synthetic fluoropolymer of tetrafluoroethylene that finds numerous applications. The most well known brand name of PTFE is Teflon (™) manufactured by the DuPont Company (™). Other materials, including Polyoxymethylene (POM), also known as acetal, polyacetal, and polyformaldehyde, is an engineering thermoplastic used in precision parts that require high stiffness, low friction and excellent dimensional stability The most well known exemplary brand name of POM is Delrin (™), also manufactured by the DuPont Company (™).

The illustrated exemplary configuration assembles the electrical power generator 310 to the bearing inner ring 112 and the sealing system 320 is affixed to the bearing outer ring 116. In this configuration, the magnetically polarized material supporting member 322 is subjected to a centrifugal force and retained in location by the circular ring shape. The magnetically polarized material supporting member 322 can be retained by friction against the circumferential gliding material 326 or an air gap 330 between the magnetically polarized material 324 an the opposing surface of the electrical power generator 310.

It is also understood that the electrical power generator 310 can be assembled to the bearing outer ring 116 and the sealing system 320 can be affixed to the bearing inner ring 112. In this alternate configuration, the magnetically polarized material supporting member 322 is subjected to a centrifugal force and retained in location by friction against the circumferential gliding material 326 or the air gap 330 between the magnetically polarized material 324 an the opposing surface of the electrical power generator 310.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

| Ref. No. | Description |
|---|---|
| 110 | bearing |
| 112 | bearing inner ring |
| 113 | inner ring planar end surface |
| 114 | bearing assembly component engagement surface |
| 115 | bearing outer race engaging surface |
| 116 | bearing outer ring |
| 117 | outer ring planar end surface |
| 118 | bearing outer surface |
| 119 | bearing outer race engaging surface |
| 120 | bearing race set |
| 150 | processing unit |
| 152 | output device |
| 154 | user input device |
| 200 | power generating subassembly |
| 296 | wired signal interface |
| 298 | wireless signal interface |
| 300 | power generating subassembly |
| 310 | electrical power generator |
| 312 | generator core |
| 316 | electrical coil |
| 318 | magnetic core |
| 320 | sealing system |
| 321 | sealing section |
| 322 | magnetically polarized material supporting member |
| 324 | magnetically polarized material |
| 326 | circumferential gliding material |
| 327 | friction reducing material |
| 328 | sealing feature |
| 330 | air gap |
| 500 | axial direction |
| 510 | radial direction |

What is claimed is:

1. A power generating bearing assembly, the power generating bearing assembly comprising:
a bearing comprising:
a bearing outer ring having an outer surface, a bearing engaging inner surface, and an outer ring end surface,
a bearing inner ring having a bearing assembly interior mating surface, a bearing outer race engaging surface, and an inner ring end surface, wherein said bearing engaging outer surface is sized to rotationally engage with said outer ring bearing engaging inner surface,
a sealing system provided between said bearing outer ring and said bearing inner ring, wherein said sealing system is secured to a sealing attachment ring, wherein said sealing attachment ring is one of said bearing outer ring and said bearing inner ring and said remaining ring is a respective rotational ring, said sealing ring comprising a sealing section adapted to seal against the other of said bearing outer ring and said bearing inner ring, said sealing system comprising a magnetically polarized material supporting member carrying a magnetically polarized material, said magnetically polarized material supporting member provided as a unitary, cantilevered section of said sealing system, said cantilevered magnetically polarized material supporting member extending axially beyond said ring end surfaces, positioning the magnetically polarized material externally and axially beyond the outer ring end surface and the inner ring end surface,
wherein said inner ring is rotatationally assembled within said outer ring bearing engaging inner surface; and
an electrical power generator including a generator core comprising an electrical coil wound about a magnetic core to generate electrical power, said electrical power generator being attached to said respective rotational ring directing said generator core in a radial direction to operationally engage with said magnetically polarized material;
wherein a relative motion between said bearing outer ring and said bearing inner ring passes said magnetically polarized material across said generator core causing said generator core to create an electrical current.

2. A power generating bearing assembly as recited in claim 1, said sealing system further comprising a sealing section inserted between said bearing outer ring and said bearing inner ring.

3. A power generating bearing assembly as recited in claim 2, said sealing section further comprising a sealing feature, said sealing feature rides against said bearing outer race engaging surface of said respective rotational ring.

4. A power generating bearing assembly as recited in claim 3, said sealing feature retains said magnetically polarized material in a spatial relation with said electrical power generator, retaining an air gap therebetween.

5. A power generating bearing assembly as recited in claim 1, further comprising a circumferential gliding material positioned between said electrical power generator and said magnetically polarized material.

6. A power generating bearing assembly as recited in claim 1, said magnetically polarized material being provided in a complete circumference.

7. A power generating bearing assembly as recited in claim 1, said magnetically polarized material being provided in a partial circumference.

8. A power generating bearing assembly as recited in claim 1, said magnetically polarized material being provided in a plurality of segments, said plurality of segments being spatially arranged about a circumference.

9. A power generating bearing assembly, the power generating bearing assembly comprising:
a bearing comprising:
a bearing outer ring having an outer surface, a bearing engaging inner surface, and an outer ring end surface,
a bearing inner ring having a bearing assembly interior mating surface, a bearing outer race engaging surface, and an inner ring end surface, wherein said bearing engaging outer surface is sized to rotationally engage with said outer ring bearing engaging inner surface,
a sealing system provided between said bearing outer ring and said bearing inner ring, wherein said sealing system is secured to said bearing outer ring, said sealing system comprising a magnetically polarized material supporting member formed in an annular ring, said sealing ring comprising a sealing section adapted to seal against the other of said bearing outer ring and said bearing inner ring, said magnetically polarized material supporting member carrying a magnetically polarized material, said magnetically polarized material supporting member provided as a unitary, cantilevered section of said sealing system, said cantilevered magnetically polarized material supporting member extending axially beyond said ring end surfaces, positioning the magnetically polarized material externally and axially beyond the outer ring end surface and the inner ring end surface,
wherein said inner ring is rotatationally assembled within said outer ring bearing engaging inner surface; and an electrical power generator including a generator core comprising an electrical coil wound about a magnetic core to generate electrical power, said electrical power generator being attached to said bearing inner ring directing said generator core in a radial direction to operationally engage with said magnetically polarized material;

wherein a relative motion between said bearing outer ring and said bearing inner ring passes said magnetically polarized material across said generator core causing said generator core to create an electrical current.

10. A power generating bearing assembly as recited in claim 9, said sealing system further comprising a sealing section inserted between said bearing outer ring and said bearing inner ring.

11. A power generating bearing assembly as recited in claim 10, said sealing section further comprising a sealing feature, said sealing feature rides against said bearing outer race engaging surface of said respective rotational ring.

12. A power generating bearing assembly as recited in claim 11, said sealing feature retains said magnetically polarized material in a spatial relation with said electrical power generator, retaining an air gap therebetween.

13. A power generating bearing assembly as recited in claim 9, further comprising a circumferential gliding material positioned between said electrical power generator and said magnetically polarized material.

14. A power generating bearing assembly as recited in claim 9, said magnetically polarized material being provided in a complete circumference.

15. A power generating bearing assembly as recited in claim 9, said magnetically polarized material being provided in a partial circumference.

16. A power generating bearing assembly as recited in claim 9, said magnetically polarized material being provided in a plurality of segments, said plurality of segments being spatially arranged about a circumference.

17. A power generating bearing assembly as recited in claim 9, said sealing system is designed to retain said magnetically polarized material in a spatial relation with said electrical power generator using inertial energy during rotation of said bearing outer ring, thus retaining an air gap between said magnetically polarized material and said electrical power generator.

18. A power generating bearing assembly as recited in claim 1, said magnetically polarized material and said electrical power generator are arranged having opposing surfaces, wherein each of the opposing surfaces of said magnetically polarized material and said electrical power generator are arranged extending outward parallel to an axial axis of said power generating bearing assembly.

19. A power generating bearing assembly as recited in claim 9, said magnetically polarized material and said electrical power generator are arranged having opposing surfaces, wherein each of the opposing surfaces of said magnetically polarized material and said electrical power generator are arranged extending outward parallel to an axial axis of said power generating bearing assembly.

* * * * *